Sept. 6, 1960     A. TOEGEL     2,951,781
METHOD OF MAKING MANDREL SETS FOR MOLDED AIRFOILS
Filed March 4, 1957

INVENTOR.
ADOLPH TOEGEL
BY
ATTORNEY

United States Patent Office 2,951,781
Patented Sept. 6, 1960

2,951,781

METHOD OF MAKING MANDREL SETS FOR MOLDED AIRFOILS

Adolph Toegel, Traverse City, Mich., assignor to Parsons Corporation, Detroit, Mich., a corporation of Michigan Filed Mar. 4, 1957, Ser. No. 643,821

7 Claims. (Cl. 154—75)

This invention relates to the manufacture of elongated airfoils, such as helicopter rotor blades, by the molding of laminated plastic materials; and has particular application to the construction of mandrels suitable for molding elongated airfoil elements having continuous spanwise reinforcing webs, such as the molded rotor blade structure set forth in the application Serial No. 621,814, filed November 13, 1956, by Edward E. Swanson, Donald E. Goodland and Alb C. Ballauer.

The objects of the present invention include: providing a set of elongated mandrels in shapes which permit molding of materials, such as glass cloth, by wrapping the individual mandrels therewith and then wrapping the mandrel group together; affording such mandrel accuracy as will result in structurally balanced, spanwise reinforced molded shells precise in thickness and internal and outside contours; readily producing such mandrel sets despite taper and twist of the airfoil or alternation of taper of mandrels; and providing for ready alignment and high strength of the mandrels so they may be easily assembled for molding and readily withdrawn from the molded shell.

In order to provide the mandrels necessary for a molded shell airfoil having spanwise-extending intermediate webs, careful account must be taken of the desired final thicknesses of the upper surface, the lower surface and the structural webs which connect them. Likewise, careful control must be exerted to assure that the material to be wrapped on the mandrels, such as glass cloth, will be properly aligned, particularly in the regions of the fillets, where the webs transfer the vertical shear into bending loads. Since the molding resins commonly used with glass cloth are quite fluid, any defect in mandrel formation or any failure to align the mandrels and space them properly with reference to each other may result in areas which either have too much resin unsupported by glass cloth, or in which there is an insufficiency of such plastic resin.

Since the airfoils may be tapered and twisted, it frequently proves extremely difficult to make a set of mandrels which will render a molded shell faithful as to the airfoil external contour and accurate enough for molding uniformly thick or tapered sections which have neither too much resin nor any "starved" areas. Tapering of the mandrels necessary to facilitate their withdrawal also complicates their geometry.

Generally (and without limiting the scope of the present invention) a method is here provided for producing a set of high-strength oversize mandrel blanks; then forming their surfaces which will be chordwise adjacent to each other when individually and collectively wrapped, to their desired width and taper; then assembling and gluing the mandrel blanks so formed together in chordwise order, separated by removable separator strips of the same thickness as the webs to be formed, then contouring the upper and lower surfaces of the assembly as a unit to the desired contour corresponding to that of the airfoil surfaces less the intended outer shell thickness; and then breaking the assembly apart at the separator strips and removing them; and finally, rounding off the spanwise edges of the mandrels to the radii desired for the fillets of the web and inner corners of the hollow shell to be molded thereon.

Figure 1:
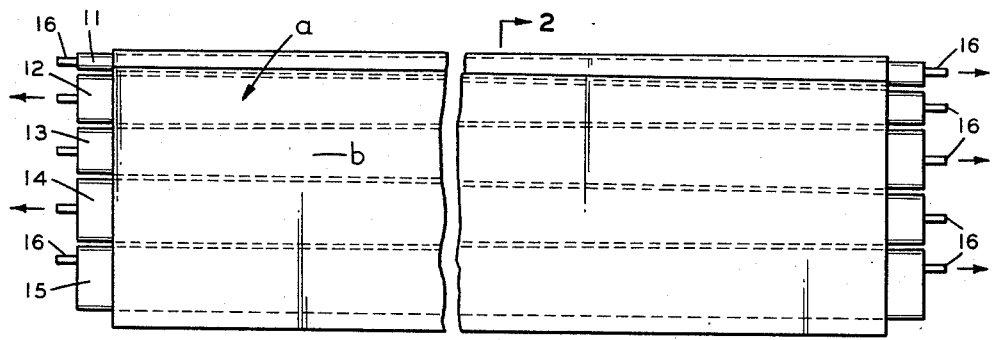
Figure 1 is a plan view of an elongated molded shell aft blade structure formed around mandrels of alternating taper as described in said co-pending application.
Figures 2, 3:
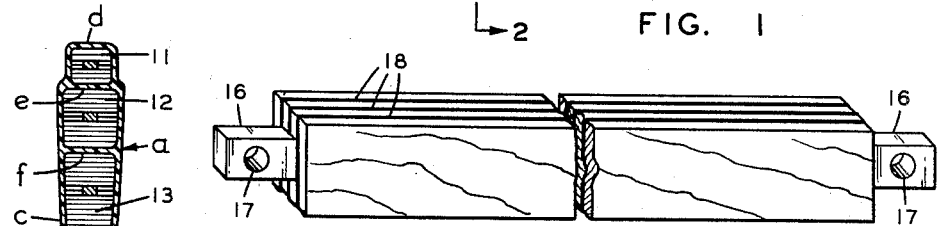
Figure 2 is a sectional view taken along line 2—2 of Figure 1.
Figure 3 is a perspective view showing the high-strength bonding of rectangular metal rods within wooden laminates to form a high-strength core for the individual mandrels.

The molded shell airfoil structure shown in Figures 1 and 2 corresponds to the aft structure shown in said co-pending application. Such shell structure, generally designated $a$, consists of a single spanwise unit molded by wrapping the set of mandrels shown, including the foremost mandrel 11 about which is formed the "cell" which nests within a metal leading airfoil edge (not shown), and the successive mandrels 12, 13, 14 and 15 which form the spanwise cells successively aft of the leading edge. Structural laminating material, such as fiberglass cloth, is coated or impregnated with laminate bonding material such as plastic resin and wrapped first around the individual mandrels and then around the mandrels assembled together. The number of wrappings around the individual mandrels and the mandrels assembled together, together with the amount of the plastic resin incorporated therewith, determine the thickness of the shell upper surface, designated $b$, the shell lower surface $c$, and the forward shear web $d$. The thicknesses of the intermediate spanwise webs $e$, $f$, $g$ and $h$, will depend upon the combined wrappings of the adjacent mandrels 11—12, 12—13, 13—14 and 14—15, and the resin incorporated with these wrappings.

In order that the mandrels may be more easily withdrawn after molding, in alternate directions shown by the arrows as described in said co-pending application, the mandrels 11, 12, 13, 14 and 15 may be alternately tapered spanwise, as shown in Figure 1. Construction of such alternately tapered mandrels heretofore presented a particularly difficult problem because of their changes in geometry along the span. The method of construction herein described applies also to straight mandrels and those of converging taper, whose geometry is less intricate. The section shown in Figure 2 is generally representative of the structure, regardless of mandrel taper.

A molded shell airfoil structure such as shown in Figure 1 may be twenty or so times as long as it is wide. It is necessary that the mandrels have exceptional strength so that they may be withdrawn by the exertion of force without fear of breakage. Therefore, each of the mandrels is made on a strong steel rod, preferably rectangular, such as the rod 16. A number of rods is selected corresponding to the number of mandrels to be formed, their length being greater than that of the mandrels to be formed and their depth and width substantially lesser, as shown. Simple locator means are provided in their ends; for example, the rods may be cut to length, clamped together, and gang drilled through the ends to provide the aligned horizontal locator apertures 17.

To the side, top and bottom surfaces of the rod 16, there are then adhesively bonded a plurality of wood plies to form a core, shown in Figure 3, with the steel rod 16 at its center. The wood plies are bonded thereon to a length as great as the mandrels to be formed but of greater depth. For this bonding operation, an adhesive bonding material and a method of bonding suitable for high-strength bonds to steel is used. A rubber-base adhesive, such as "Plastilock," cured under heat and pressure for a suitable curing time, is preferred. Such high-strength bonding adhesive is shown by the heavy lines 18 of Figures 3 to 7.

The width of the core so formed (or, if the laminations are arranged horizontally, the height) is increased by gluing or otherwise laminating additional wood plies to each side of the core; until there is formed a mandrel blank of greater depth and width than the final desired mandrel. The glue joints by which such additional laminae are added, are designated 19.

Figure 4:
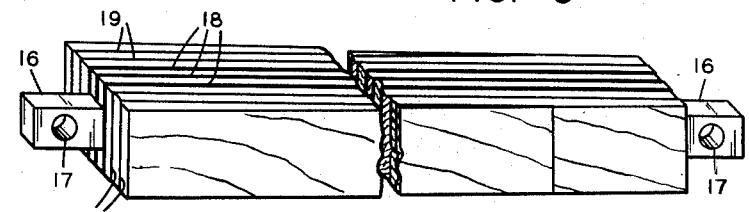
Figure 4 is a perspective view of an oversize mandrel blank formed by laminating wood plies onto the core of Figure 3, the surfaces which are to be chordwise adjacent the other mandrel surfaces being shown formed to final taper.

The oversize blanks so formed are then carefully planed off along the edges which are to be chordwise adjacent each other, to their respective final dimensions (except at the corners which will be filleted), taking account of the thicknesses desired for the intermediate webs e, f, g and h. One mandrel blank, with its chordwise surfaces so shaped to final width and taper, is shown in Figure 4.

Removable separator strips are then selected whose thickness corresponds to the thicknesses of said intermediate webs e, f, g and h to be formed. These strips may be of paperboard or cardboard, or other material which can be broken apart later and completely removed. It is important that, where paperboard is used, the thickness be that which, on assembly for gluing, will correspond to the thicknesses desired for the intermediate webs. Such paperboard separator strips are designated 20 and shown in Figure 5.

Figure 5:
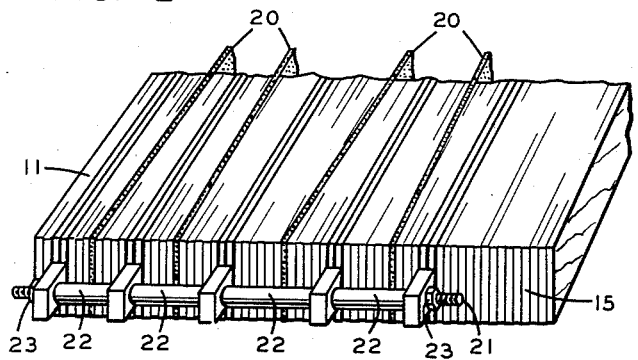
Figure 5 is a fragmentary perspective view showing a set of alternately tapered mandrel blanks made in the manner of Figure 4, assembled together with paperboard separator strips, prior to contouring.
Figure 6:
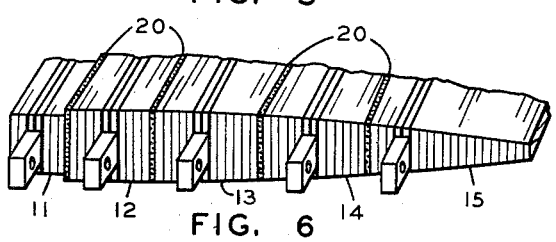
Figure 6 is a fragmentary perspective view similar to Figure 5, showing assembly after contouring.

Glue is applied to each side of the separator strips; and the several mandrel blanks, with their chordwise adjacent surfaces so planed, are then assembled and glued together. For purpose of alignment, the locator apertures 17 in the ends of the rods 16 are conveniently utilized. At both ends of the rods, threaded end locator pins, such as the pin 21 shown in Figure 5, are passed through the apertures 17, and spacing collars 22 or other alignment means inserted, and secured with nuts 23. This assures alignment precisely as in the final molding operation.

The assembly, shown fragmentarily in Figure 5, is glued together as a single mandrel assembly which is oversize as to depth. This assembly is then shaped, in the same manner as a solid wood mandrel may be shaped, so that the upper and lower surfaces aft of the leading edge portion correspond precisely to mold lines which are a shell thickness within the upper and lower airfoil surfaces. The forward edge of the first mandrel 11 and the aft edge of the last mandrel 15 are likewise formed at this stage. The assembly, so contoured, is carefully checked for precise correlation with the airfoil section and its desired twist and taper, if any.

The assembly is then broken apart by removing all bolted connections and breaking out the separator strips. Paperboard will break readily and the paper layers which may adhere when the assembly is broken apart are removed.

Figure 7:
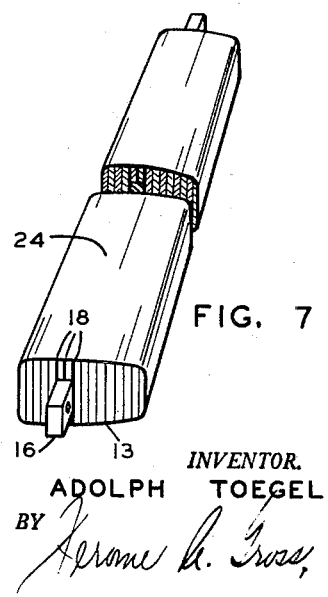
Figure 7 is a perspective view of a typical completed mandrel (the middle one shown in Figure 6) after separating and finishing.

Continuous fillets for the spanwise webs are provided by then rounding off the spanwise edges of the mandrels to the fillet radii desired. The inner corners of the shell at the juncture with the foremost web d are likewise rounded off, and suitable provision is made for fill at the trailing edge of the chordwise aft mandrel 15. A typical completed mandrel, with its edges so rounded off to provide the necessary fillets, is shown in Figure 7, this being the center mandrel 13. The smoothly rounded exterior mandrel surface is designated 24.

In use, the mandrels are individually wrapped with the desired number of thicknesses of fiberglass cloth coated with the bonding resin; and they then may be aligned in location and are preferably bolted together with the same pins 21 and spacing collars 22, thus assuring that the intermediate spanwise webs e, f, g and h will not be "starved." The entire mandrel assembly is then wrapped with additional thicknesses of glass cloth, and coated with the correct quantity of fluid resin adjacent all surfaces; and the assembly is secured inside female molds which give the desired external airfoil contour, as well as the final shape of the forward portion within the high-strength leading edge.

When the assembly is cured, the mandrels are withdrawn. The steel rods 16 and high-strength cores formed thereon permit pulling the mandrels with high forces, which are gradually transferred in shear along the rectangular sides of the rods 16 and through the high-strength steel-to-wood bonds 18 outwardly as distributed loads through the entire mandrels.

If easier removal of the mandrels is desired, there may be employed as a covering on each, a thin layer of "Teflon" or other material having a slick surface to which plastic resins do not adhere. Such material may be in sheet form on a cloth backing strip. When it is to be used, the following alternate steps are substituted for the corresponding steps heretofore described:

The chordwise adjacent edges of the blanks are so planed that the chordwise width of each is less than the desired amount for the cell, at each spanwise station, by two thicknesses of such slick-surfaced material. Instead of using separator strips 20 the same thickness as is desired for the intermediate webs, material for them is selected thicker than the desired web thickness by two thicknesses of the slick-surfaced material to be used. Contouring the exterior of the glued-up assembly is continued to mold lines which are within the upper and lower airfoil surfaces a distance equal to the desired shell thickness plus one thickness of such material.

After completing the other steps of mandrel-making, each mandrel so formed is covered with a glued-on layer of such slick-surfaced material. The mandrels then have the outer surface dimensions corresponding to the surface 24, but slick and non-adherent to the fluid plastic resin. The slick surface serves in the manner of a lubricant in that it permits removal of the mandrels with far less force than would otherwise be required. Because of the elasticity of the molded fiberglass construction, once one of the center mandrels, such as the mandrel 13, is removed from the molded assembly, the others may be removed by pulling while flexing the molded shell. Accordingly it may be satisfactory in some instances to make special provision for the ready removal of a center mandrel by making only this mandrel with a "Teflon" covering (or with other provision for ready removal), and then removing it first from the molded assembly.

Changes in detail in the structures provided and in the steps of the process herein described may be made without departing from the scope of the present invention, which should not be construed narrowly but as fully coextensive with the claims.

I claim:

1. For use in manufacturing spanwise-webbed laminated plastic shell airfoil elements for helicopter rotor blades and the like, the method of producing a set of aligned, contoured spanwise wood mandrels, comprising the steps of selecting a number of metal rods equal to the number of mandrels to be formed, and of greater length and lesser depth and width, providing locator means at their ends, adhesively bonding intermediate their ends to their top, bottom and side surfaces and to each other, wood plies whose length is as great as the mandrels to be formed, the quantity of such plies being sufficient to form mandrel blanks oversize as to depth and chordwise width, then shaping the chordwise adjacent surfaces of such oversize mandrel blanks to desired final width and taper, then assembling them in chordwise order, inserting alternately therebetween glue layers and paperboard strips whose thickness under pressure of gluing equals the intended thickness of the spanwise webs to be formed in such shell airfoil elements, then locating in alignment and gluing to form a glued-up assembly oversize as to depth, then shaping the upper and lower surfaces of such glued-up assembly to mold lines corresponding to the upper and lower airfoil surfaces less the intended shell thicknesses, then breaking the glued-up assembly apart at the paperboard strips into mandrels and removing all the paperboard, and then rounding off the spanwise edges of the mandrel to the fillet radii desired for the webs of such shell.

2. For use in manufacturing spanwise-webbed laminated plastic shell airfoil elements for helicopter rotor blades and the like, the method of contouring a set of spanwise wood mandrels, comprising the steps of shaping to desired final width and taper the chordwise-adjacent surfaces of a plurality of oversize wood mandrel blanks, assembling them in chordwise order, inserting alternately therebetween glue layers and paperboard strips whose thickness under pressure of gluing equals the intended thickness of such spanwise webs, and gluing same in chordwise alignment to form a glued-up assembly oversize as to depth, then shaping the upper and lower surfaces of such glued-up assembly to mold lines corresponding to the upper and lower airfoil surfaces less the intended shell thicknesses, and then breaking the glued-up assembly apart at the paperboard strips into mandrels and removing all the paperboard.

3. The process defined in claim 2 with the preliminary steps of forming each oversize wood mandrel blank by selecting a metal rod of greater length than the mandrel blank to be formed and of lesser depth and width, then adhesively bonding intermediate its ends to its top, bottom and side surfaces and to each other, wood plies whose length is as great as the mandrel blanks to be formed, the quantity of such plies being sufficient to form a mandrel blank oversize as to depth and chordwise width.

4. The process as defined in claim 3, the adhesive bonding comprising a first stage of bonding the metal rod within the wood plies immediately thereadjacent by heat and pressure curing, and a second stage of gluing additional wood plies to the outer surfaces of the wood plies so bonded to the rod.

5. For use in manufacturing spanwise-webbed laminated shell airfoils and the like, the method of contouring a set of spanwise mandrels, comprising the steps of forming the chordwise-adjacent surfaces of a plurality of oversize mandrel blanks, assembling and securing the mandrel blanks in chordwise order with removable separator strips alternately therebetween, contouring the upper and lower surfaces of such secured assembly to the desired contours of the corresponding airfoil surfaces less the intended shell thickness, and then separating the assembly into individual mandrels and removing the separator strips.

6. For use in manufacturing laminated shell airfoils having continuous internal spanwise webs filleted into the shell surfaces, a method of forming a set of contoured spanwise mandrels comprising the steps set forth in claim 5, together with a final step of rounding off the spanwise edges of the mandrels to the radii desired for such fillets.

7. The method of producing a set of slick-surfaced, spanwise mandrels for use in molding spanwise-webbed multi-cell laminated shell airfoils, comprising the steps of forming the chordwise adjacent surfaces of a plurality of oversize mandrel blanks to chordwise dimensions less than the desired chordwise width of the cells to be formed by an amount equal to two thicknesses of a slick-surfaced sheet material, then assembling and securing the mandrel blanks in chordwise order with removable separator strips alternately therebetween, said strips being of a thickness greater than the spanwise webs to be formed by an amount equal to two thicknesses of such slick-surfaced sheet material, then contouring the upper and lower surfaces of such secured assembly to the desired contours of the corresponding airfoil surfaces less the total of the intended shell thickness plus the thickness of such slick-surfaced sheet material, then separating the assembly into individual mandrels, removing the separator strips, rounding off the spanwise edges of each mandrel, and then covering with and securing to the outer surface of each mandrel a thickness of such slick-surfaced material.

References Cited in the file of this patent

UNITED STATES PATENTS

| | | |
|---|---|---|
| 1,709,306 | Burger | Apr. 16, 1929 |
| 2,383,519 | Sharpe | Aug. 28, 1945 |
| 2,560,992 | Schlueter | July 17, 1951 |
| 2,618,481 | Dosker | Nov. 18, 1952 |